(12) United States Patent
Dasgupta et al.

(10) Patent No.: US 9,710,759 B2
(45) Date of Patent: Jul. 18, 2017

(54) APPARATUS AND METHODS FOR CLASSIFYING SENDERS OF UNSOLICITED BULK EMAILS

(75) Inventors: Anirban Dasgupta, Albany, CA (US); Kilian Quirin Weinberger, Mountain View, CA (US); Yehuda Koren, Zichron Yaakov (IL)

(73) Assignee: Yahoo! Inc., Sunnyvale, CA (US)

( * ) Notice: Subject to any disclaimer, the term of this patent is extended or adjusted under 35 U.S.C. 154(b) by 470 days.

(21) Appl. No.: 12/686,240

(22) Filed: Jan. 12, 2010

(65) Prior Publication Data

US 2011/0173142 A1 Jul. 14, 2011

(51) Int. Cl.
*G06F 15/18* (2006.01)
*G06N 99/00* (2010.01)
*G06Q 10/10* (2012.01)

(52) U.S. Cl.
CPC ......... *G06N 99/005* (2013.01); *G06Q 10/107* (2013.01)

(58) Field of Classification Search
None
See application file for complete search history.

(56) References Cited

U.S. PATENT DOCUMENTS 7,406,501 B2 * 7/2008 Szeto et al. ............... 709/206
7,783,597 B2 * 8/2010 Kirsch ....................... 707/609
2007/0156886 A1 * 7/2007 Srivastava ................. 709/224
2009/0037546 A1 * 2/2009 Kirsch ....................... 709/206
2011/0264585 A1 * 10/2011 Abdulhayoglu ............. 705/50

OTHER PUBLICATIONS

Zhoa et al., "BotGraph: Large Scale Spamming Botnet Detection", Apr. 11-13, 2007, NSDI, pp. 1-26.*
Hao et al., Detecting spammers with SNARE: spatio-temporal network-level automatic reputation engine, Proceedings of the 18th conference on USENIX security symposium, p. 101-118, Aug. 10-14, 2009, Montreal, Canada.*
Lam et al, "A Learning Approach to Spam Detection based on Social Networks", Aug. 3, 2007, Fourth Conference on Email and Anti-Spam, pp. 1-9.*
Osterman Research White Paper, "A New Approach to Defeating Spam", published Mar. 2008.
Abaca Technology Whitepaper, "Groundbreaking Technology Redefines Spam Prevention—Analysis of a New High-Accuracy Method for Catching Spam", published Oct. 2007.

* cited by examiner

*Primary Examiner* — Paulinho E Smith
(74) *Attorney, Agent, or Firm* — Weaver Austin Villeneuve & Sampson LLP

(57) ABSTRACT

In accordance with one aspect, methods and apparatus facilitate the filtering of unsolicited bulk electronic mail (email) sent from spammers. A plurality of recipient patterns for a plurality of emails from known spammers is logged. A plurality of recipient patterns for a plurality of emails from known non-spammers is also logged. A probabilistic model for predicting whether an unknown sender identity is a spammer is generated or modified based on the logged recipient patterns for the emails from known spammers and known non-spammers.

22 Claims, 6 Drawing Sheets

APPARATUS AND METHODS FOR CLASSIFYING SENDERS OF UNSOLICITED BULK EMAILS

BACKGROUND OF THE INVENTION

The present invention is related to techniques and mechanisms for classifying senders of unsolicited bulk emails and the like. Additionally, it relates to filtering such unsolicited bulk emails based on such classification.

Users with email accounts typically receive daily unsolicited bulk email or "spam." If unfiltered, spam can quickly inundate a user's inbox, thereby, wasting resources. Additionally, users can spend significant amounts of time culling unwanted spam from desired emails.

Spam filters exist for filtering spam based on the textual content within the email body. However, spammers continue to strive to defeat such filtering mechanisms using various techniques, such as obscuration of certain "spam-like" words with random characters (e.g., V$iagra), rendering the email body as an image, etc.

Other spam filters identify spam based one whether a particular IP address is blacklisted. A particular IP address is defined as a spammer by the recipients of the spam emails. Often, this recipient feedback can be significantly delayed since there may be a large user reaction time-lag. If an IP address starts sending a high volume of emails to users, and the content of the emails is not identifiable and the IP address has not been observed before, the email server typically delivers the emails. The filtering process then waits for the users to rate the emails as spam in order to potentially get enough certainty to block emails from the particular IP address. This process creates a window (during which the classifier waits for user feedback) during which spammers can send high volume of emails that are being delivered.

Accordingly, improved mechanisms for identifying senders of unsolicited bulk emails and the like would be beneficial.

SUMMARY OF THE INVENTION

In certain embodiments, training system and methods for a spam filter model have been disclosed. In a specific embodiment, a computer implemented method of filtering unsolicited bulk electronic mail (email) includes (i) receiving a plurality of emails associated with a particular sender identifier (ID), (ii) determining whether the emails received for the particular sender ID comprise unsolicited bulk email by inputting a plurality of sender behavior parameters, which are associated with the particular sender ID, into a probabilistic model generated from a training process that is based on a training set of sender behavior characteristics that have been associated with indicators for defining whether specific sender IDs are associated with unsolicited bulk emails, and (iii) inhibiting the received emails from reaching recipients of such emails if the received emails are determined to be unsolicited bulk emails. In a further aspect, the training set of sender behavior characteristics include recipient patterns for the emails with respect to specific sender IDs and the sender behavior characteristics of the particular sender ID includes a particular recipient pattern for emails associated with the particular sender ID.

In another embodiment, a computer implemented method of facilitating the filtering of unsolicited bulk electronic mail (email) includes (i) logging a plurality of recipient patterns for a plurality of emails from known spammers, (ii) logging a plurality of recipient patterns for a plurality of emails from known non-spammers, (iii) and generating or modifying a probabilistic model for predicting whether an unknown sender identity is a spammer based on the logged recipient patterns for the emails from known spammers and known non-spammers.

In a specific implementation, the recipient patterns for each known spammer and non-spammer includes identification of the recipients to which the known identified spammer or non-spammer sends emails over a specified period. In another aspect, the unknown sender identity is a sender Internet Protocol (IP) address. In yet another implementation, the known spammers and non-spammers have been identified by a plurality of recipients of the emails who identify such received emails as spam or non-spam. In a further aspect, the model is used to predict a likelihood of a unknown sender being a spammer based on the unknown sender's recipient pattern for sending a plurality of emails. In another embodiment, each combination of one or more recipients is associated with a score, and the model is configured to determine a total score for each recipient pattern and predict whether each sender is a spammer based on such total score for the recipient pattern of each sender, and wherein one or more scores of each recipient combination are adjusted to generate the model until the model generates total scores for the recipient patterns of the known spammers and non-spammers that correctly indicate their spammer or non-spammer status.

In another embodiment, the invention pertains to an apparatus having at least a processor and a memory. The processor and/or memory are configured to perform one or more of the above described operations. In another embodiment, the invention pertains to at least one computer readable storage medium having computer program instructions stored thereon that are arranged to perform one or more of the above described operations.

These and other features of the present invention will be presented in more detail in the following specification of certain embodiments of the invention and the accompanying figures which illustrate by way of example the principles of the invention.

DETAILED DESCRIPTION OF THE SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

As used herein, the term "spam" is used to denote any type of unsolicited bulk messages, such as email, instant messages, etc. Techniques of the present invention provide a training process for generating a model for facilitating spam filtering. In general, certain assumptions can sometimes be made regarding spammer behavior, and these assumptions can be utilized to train a model for indicating the likelihood of whether a particular user is sending spam. For example, spammers typically obtain email address lists from various sources, and these obtained email lists will tend to have certain non-random patterns. In contrast, legitimate bulk email senders typically obtain their email lists through user subscriptions, and these email lists will appear more random then spammer email lists. In a specific example, a spammer buys a large email list from an underground market. The spammer then typically breaks up this list into chunks, and automated bots are configured to automatically send each email list chunk at particular given times. A spammer also tends to send parts of a large list in a relatively short period of time.

Sender behavior can be tracked and correlated to particular spammer behavior. In one example, a learning process operates on a set of training data that includes behavior patterns, including recipient patterns for users who have received emails from known spammers and known non-spammers. These known recipient patterns can be used to generate a model for predicting spammers from unknown users based on their own recipient patterns.

Figure 1:
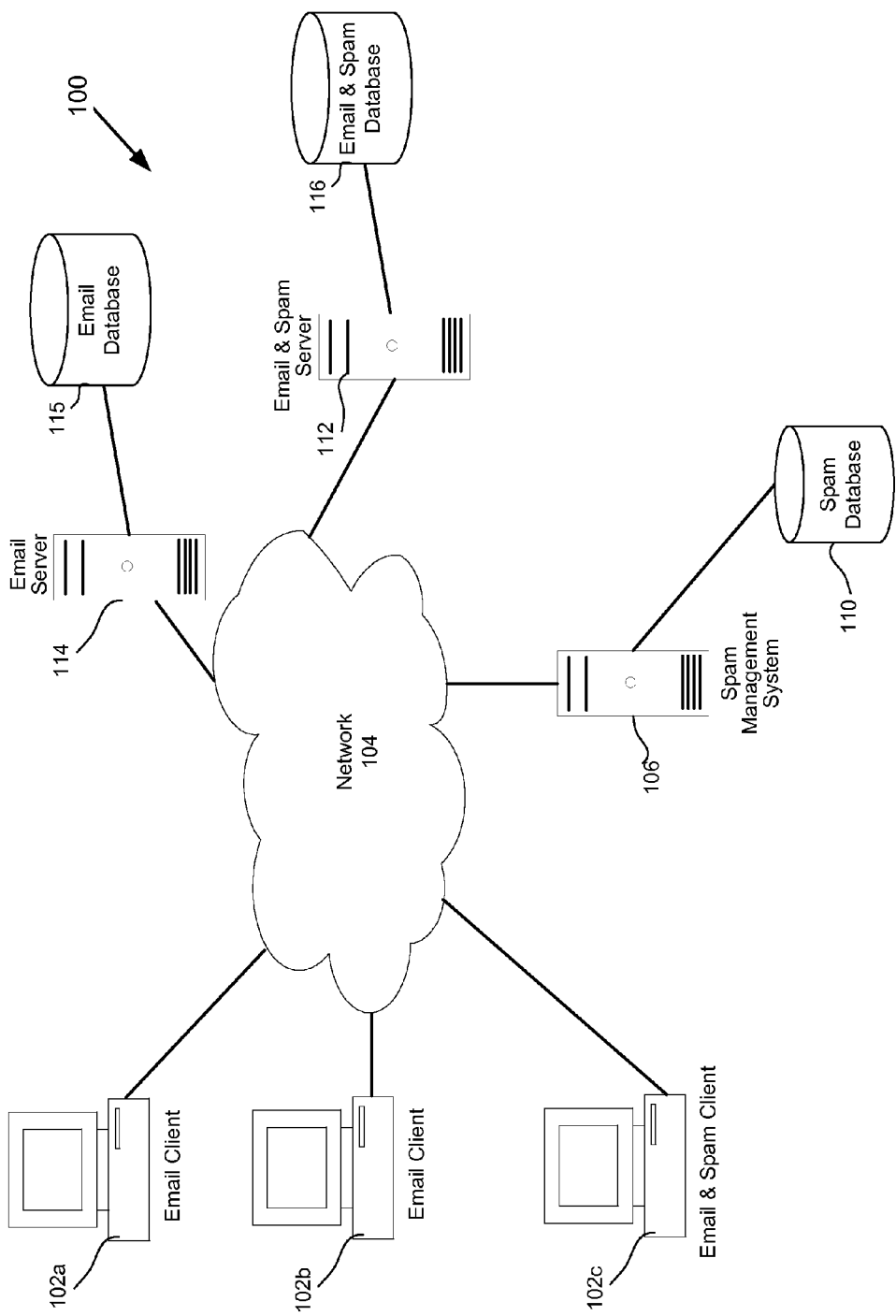
FIG. 1 illustrates an example network segment in which the present invention may be implemented in accordance with one embodiment of the present invention.

Prior to describing detailed mechanisms for training and using a spam filter process, a computer network architecture will first be briefly described to provide an example context for practicing techniques of the present invention. FIG. 1 illustrates an example network segment 100 in which the present invention may be implemented in accordance with one embodiment of the present invention. As shown, a plurality of email clients (e.g., 102a~c) may access an email application, for example, on email servers 112 or 114 via network 104. Each email server may have access to one or more database(s) (e.g., 115 and 116) into which email, sender, and recipient information may be retained.

The network may take any suitable form, such as a wide area network or Internet and/or one or more local area networks (LAN's). The network 104 may include any suitable number and type of devices, e.g., routers and switches, for emails from each client to the email application servers, forwarding emails to the receiving clients, or forwarding data between various servers.

Embodiments of the present invention may also be practiced in a wide variety of network environments (represented by network 104) including, for example, TCP/IP-based networks (e.g., Rate Control Protocol or RCP, Transport Control Protocol or TCP, Fast TCP, Stream-based TCP/IP or STCP, eXplicit Control Protocol or XCP, etc.), telecommunications networks, wireless networks, mobile networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

Each email server may provide an email application. An email application generally allows users (human or automated entity) to send emails to each other via network 104. Embodiments of the present invention may be employed with respect to emails that are managed by email applications available from various service providers, such as Yahoo!, Google, Microsoft, etc. The email applications may be implemented on any number of servers although only two email servers 112 and 114 are illustrated for clarity and simplification of the description.

When an email is received by an email server, such server may then forward the received email to its intended destination, retain information regarding the email, sender, and recipients of such email, as well as filtering such email based on any suitable filter techniques. Embodiments of the present invention may include a spam management process, which may be implemented on a separate system or server (e.g., 106) from the email application or implemented withced on a combination email and spam server (e.g., 112), and this spam process may include training of a spam model to recognize spammers and utilizing such model to filter email from spammers. Logged behavioral aspects of email senders may also be utilized to train such spam processes as described further herein. Such sender behavior characteristics may be retained in one or more databases, e.g., email database 115, email and spam database 116, and/or spam database 110.

Figure 2A:
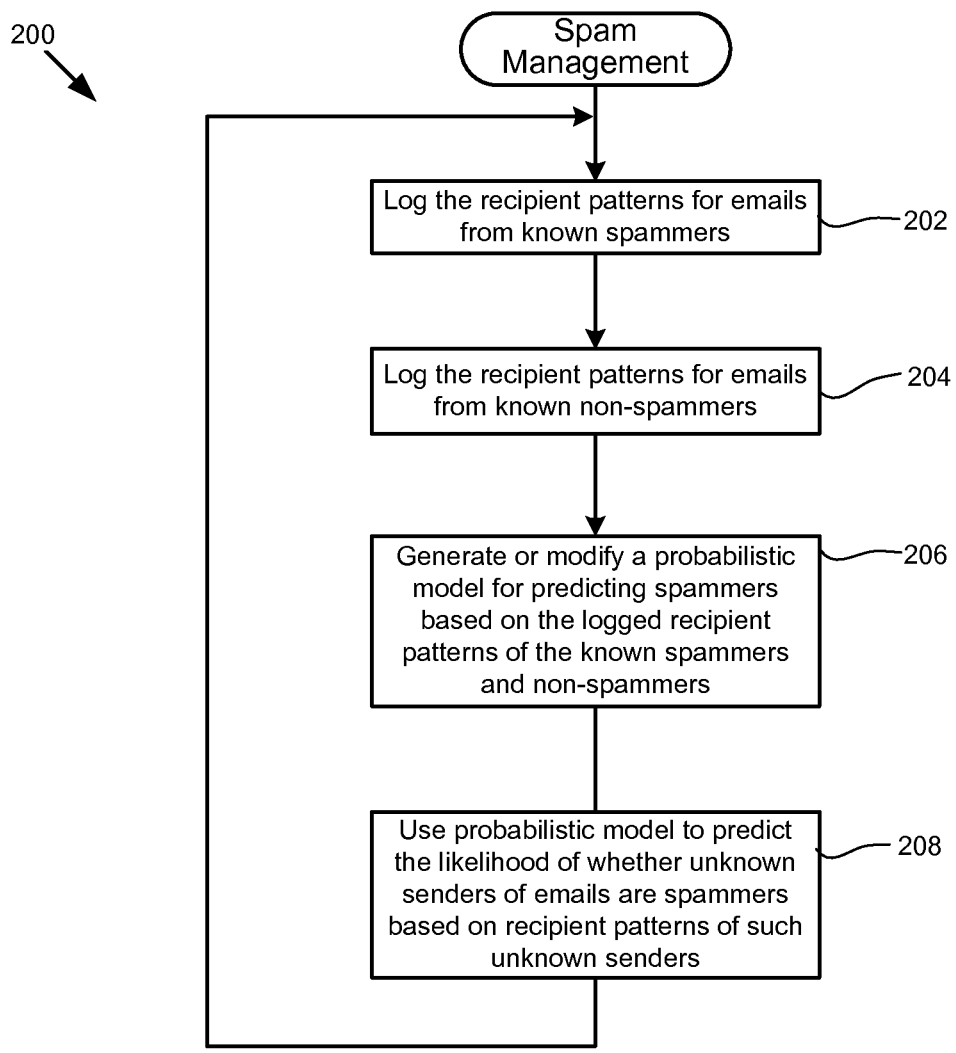
FIG. 2A is a flow chart illustrating an overview of a procedure for model-based spam filtering in accordance with one embodiment of the present invention.

FIG. 2A is a flow chart illustrating an overview of a procedure 200 for model-based spam filtering in accordance with one embodiment of the present invention. Initially, recipient patterns for emails from known spammers may be logged in operation 202. Recipient patterns for emails from known non-spammers may be logged in operation 204.

Recipient patterns may generally include information about who is being sent email by the identified sender, characteristics of the emails' content, and/or the timing of such emails. By way of examples, recipient information may include one or more of the following: identification of the recipients to which the identified spammer or non-spammer sends emails over a specified period, a count of the number of total emails, count of the number of repeat emails to particular recipients, average/mean email frequency, maximum frequency, minimum frequency, the bursty nature of the sending patterns, whether any of the recipients have mutually exchanged emails (e.g., whether an IM, instant message, was sent before) as they are liable to do if the recipients form a mutually known acquainted group, geographical distance between the sender and recipients, etc.

So as to log recipient patterns for particular known spammers and known non-spammers, certain sender identities (e.g., Internet Protocol (IP) addresses) may be identified as spammers or non-spammers using any suitable identification technique. For instance, specific emails and their associated senders may be identified or marked as spam or non-spam by recipient users. When a predetermined number or a predetermined percentage of emails from such identified sender have been marked as spam or non-spam by recipients, such senders (e.g., their associated sender ID) can be defined as spammers or non-spammer, respectively. Other spam identification techniques may include checksum-based filtering, checks for confirming compliance with SMTP (simple mail transfer protocol) or standard addressing and MTA (mail transfer agent) operation, invalid pipelining identification, identification of nolisting techniques used by senders (e.g., using unreachable mail exchanger records), etc.

In another example, spam may be identified by detecting particular words or statistical content which tend to be contained in spam emails, and such emails may then be blocked. For instance, a Bayesian or Markovian discrimination spam filtering technique may be used to identify spammers. In order to eliminate false positives, the blocked emails may be presented to the recipients (e.g., in a junk mail folder) so as to give the recipients an opportunity to reverse a spam definition. If recipients (e.g., a specified number or percentage of recipients) do not reverse a spam definition in a specified time period, the associated sender ID may then be identified as a spammer so that their email behavior patterns can be subsequently monitored.

Similar techniques may be used to identify legitimate senders (e.g., recipient marking or content analysis). In another example, particular servers may be authenticated as senders of legitimate email.

As such known senders continue to send email after they have been identified as spammers (e.g., after they have been blacklisted) or non-spammers (e.g., after they are whitelisted), recipient patterns for associated sender ID's can be logged. Referring back to FIG. 2A, a probabilistic model for predicting spammers based on the logged recipient patterns may then be generated or modified based on the known behavior patterns of known spammers and non-spammers in operation 206. The probabilistic model may then be used to predict the likelihood of whether unknown senders of emails are spammers based on behavior patterns of such unknown senders in operation 208.

Figure 2B:
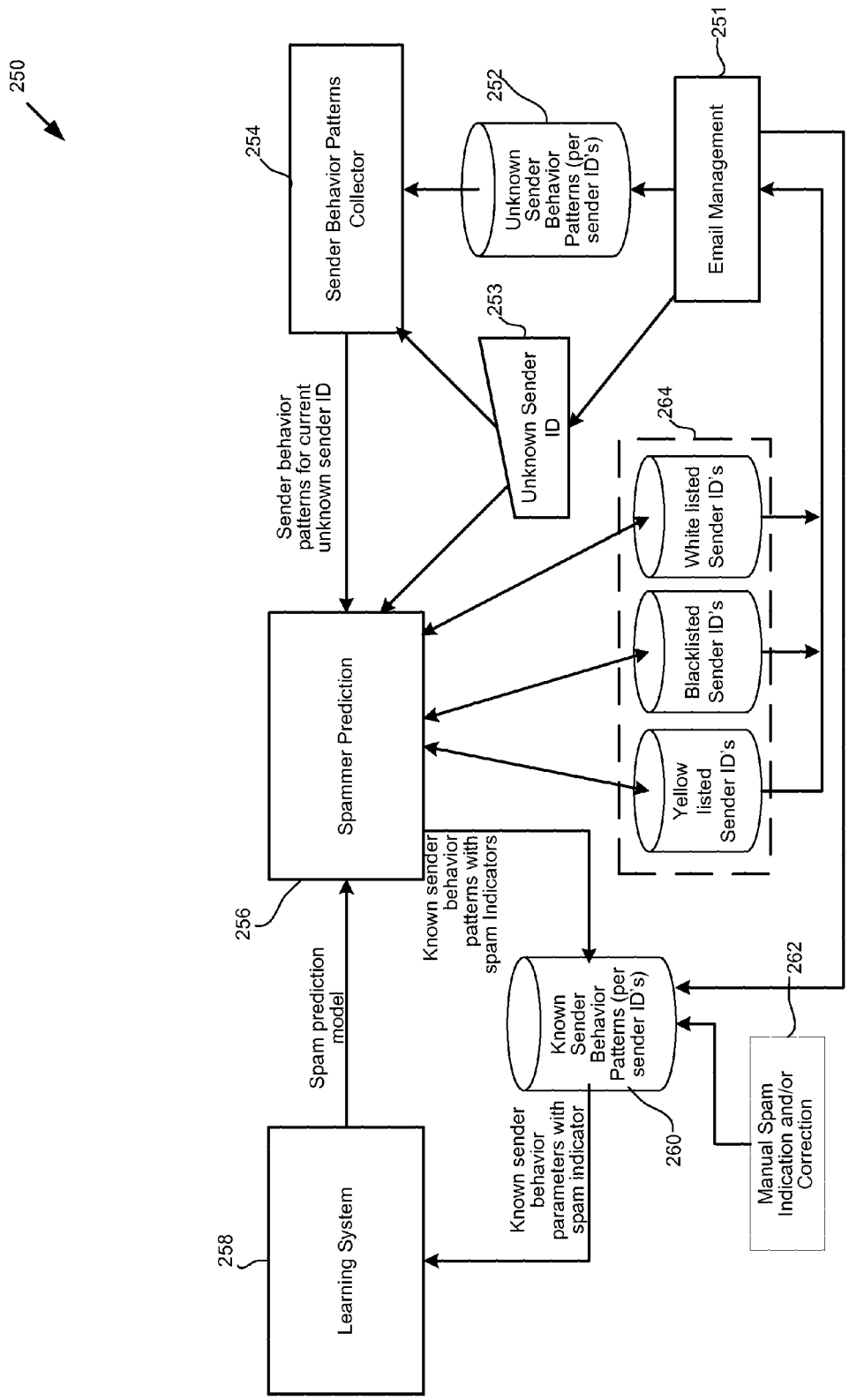
FIG. 2B is a diagrammatic representation of a spam detection system for unknown senders in a specific implementation of the present invention.

FIG. 2B is a diagrammatic representation of a spam detection system 250 for unknown senders in a specific implementation of the present invention. The term "unknown" sender or sender ID is not meant to imply that the unknown sender is not already associated with a spam indicator for specifying whether the sender is a spam sender. Said in another way, the spam detection techniques described herein can be implemented independently of any spam definitions that have been associated with a particular sender, e.g., by present filtering embodiments and/or other spam filtering techniques. For example, the associated sender ID may be defined as a spammer or a potential spammer, and this definition can be reevaluated by the techniques of the present invention. Although only described with respect to a single unknown sender ID, the following operations may be performed for a plurality of unknown sender IDs associated with a plurality of emails. Spam filtering may be selected by the recipient user, e.g., via a selectable email option or via a user profile that was previously set up by the user. The spam detection and subsequent filtering may also be automatically performed for all emails from unknown senders.

As shown, the spam detection system 250 may include a learning system 258 for generating a spam prediction model, a spammer detection module 256 for spammer prediction (e.g., for a particular sender ID) based on such model, a sender behavior patterns collector module 254 for collecting behavior patterns from an unknown sender ID, and an email management system 251 for managing email exchanges.

The email system 251 may receive emails from senders and store data regarding the behavior patterns of such senders. For instance, the email system 251 can store known behavior patterns for known senders in database 260 and store (e.g., via sender behavior patterns collector 254) unknown behavior patterns for unknown senders in database 252.

The known sender behavior patterns may be utilized by learning system 258 to generate or modify a spam prediction model. That is, the known sender behavior patterns are used as a training set. The behavior patterns may include identifying information for a plurality of known behaviors for known spammers and known non-spammers as described herein. For instance, this training set may initially be provided by manually classifying a large set of sender IDs (and their associated behavior patterns) as spammers or non-spammers. In one embodiment, 6000 or more known senders and their behavior patterns (3000 spammers and 3000 non-spammers) are initially, manually classified as spammer or non-spammer so as to achieve a reasonable level of accuracy for the spammer prediction model.

The training set of behavior patterns may also include behavior patterns that have been analyzed by the spam prediction system 256 based on a previously generated model. For instance, a new model may be generated once a month or every week. That is, a feedback mechanism may be provided so that a new spam prediction model is generated periodically based on newly analyzed behavior patterns.

The system 250 may also include a manual spammer indication and/or correction module 262. This manual module 262 may be include mechanisms to allow a user to manually provide or correct a spammer or non-spammer indicator for any number of sender ID's and/or associated behavior patterns, e.g., of known sender behavior patterns database 260. In other words, the manual module may allow a user to provide the initial training set and/or to correct spam indicators that are determined by the spam prediction system 256. For example, the manual module may include a user interface for viewing behavior patterns and inputting a spam indicator value (e.g., spammer or non-spammer) by any suitable input mechanisms, such as a pull-down menu with selectable spammer or non-spammer options, selectable spammer or non-spammer buttons, or a text input box into which a user can enter a string indicating "spammer" or "non-spammer" by way of examples.

When an unknown user sends an email via the email system 251, the associated unknown sender ID 253 (e.g., which has not been analyzed by a spam filter) may be passed to spammer prediction module 256. Behavior patterns for such unknown sender ID are also logged by sender behavior pattern collector 254. The behavior pattern collector module 254 generally collects a set of behavior pattern parameters for the unknown sender ID that can be usefully analyzed by spam prediction module 256. In this implementation, the spam prediction module 256 receives each set of behavior patterns and outputs a spam indicator for each set of behavior patterns and associated sender ID to known sender behavior patterns database 260. The spam indicator for a particular set of behavior patterns indicates whether such patterns belong to a spammer sender ID, and may also indicate a confidence value for such spam or non-spam indication.

Known sender IDs and their known spammer or non-spammer status may also be stored in one or more databases 264. Although not shown, such databases may be accessible through a domain name server (DNS). For instance, sender IDs (e.g., IP addresses) that are known to be spammers are stored in a blacklisted sender ID database. Conversely, sender IDs that are known to be non-spammer are stored in a white-listed sender ID database. Lastly, sender IDs that are potentially or suspect spammers may be stored in a yellow-listed sender ID database.

Any suitable learning system may be utilized. Examples of suitable learning techniques include Support Vector Machines (e.g., LIBSVM), neural networks, collaborative filtering techniques, Decision Tree (e.g., TreeNet), latent semantic indexing, probabilistic latent semantic analysis, logistic regression, etc. In general, information retrieval techniques based on matrix factorization methods, logistic regression, and/or neural networks can be used. A suitable open source learning Support Vector Machine algorithm is also available through Kernel-Machines.org. Embodiments of the Support Vector Machine are further described in (i) the publication by Ron Meir, "Support Vector Machines—an Introduction", Dept. of Electr. Eng. Technion, Israel, June 2002, (ii) U.S. Pat. No. 7,356,187, issued 8 Apr. 2008 by Shananhan et al., and (iii) U.S. Pat. No. 6,816,847, issued 9 Nov. 2004 by Toyama. Example classifiers implemented with neural networks are described in (i) B. B. Nasution, A. I. Khan, "A Hierarchical Graph Neuron Scheme for Real-Time Pattern Recognition", IEEE Transactions on Neural Networks, vol 19(2), 212-229, February 2008 and (ii) Siegelmann, H. T.; Sontag, E. D. "Turing computability with neural nets". Appl. Math. Lett. 4 (6): 77-80, (1991). These documents and patents are incorporated herein by reference in their entirety.

In a specific implementation, the behavior pattern for each sender ID may be stored as a vector in a multi-dimensional space so that each dimension corresponds to a particular recipient ID, and the model can give each possible resulting vector an associated score. A sparse representation of the behavior pattern vectors can also be used, which can influence the type of applicable classifier. Each recipient combination could result in different weights or scores. For instance, each recipient ID could be given a particular score, each pair of recipient IDs could be given a particular score, each triplet of recipient IDs could be given a particular score . . . , etc. Each recipient ID combination could be given an initial default score for purposes of training the model. For each behavior pattern, the model can then calculate a particular total score based on which combinations of recipient IDs are present within the behavior pattern (e.g., which recipient IDs received email from the particular sender ID over a specified period of time, such as 1 day).

The model could also be configured to determine whether a particular sender ID's total score indicates spam, non-spam, or potential spammer. For instance, if the total score was above a predetermined threshold, the sender ID would be designated as a spammer, while being designated as a non-spammer if the total score was below a same or different predetermined threshold. The sender ID can optionally be designated as a potential spammer if the score is between the upper and lower thresholds (e.g., the upper threshold differs from the lower threshold). The scores for each recipient ID combination as used by the model would then be adjusted until the total scores and associated spam indicators (e.g., spammer, non-spammer, or potential spammer) as determined by the model for each behavior pattern substantially matches the known designations for the known behavior patterns. For instance, the model scores could be adjusted until the spam designations could be accurately determined for all or a predetermined percentage of the known behavior patterns.

In another example, Support Vector Machines may build classifiers by identifying a hyperplane that partitions two classes of spam and non-spam behavior patterns in a multi-dimensional feature space into two disjoint subsets with a maximum margin, e.g., between the hyperplane and each class. In the linear form of SVM that is employed in one embodiment, the margin is defined by the distance of the hyperplane to the nearest spam and non-spam behavior patterns cases for each class. Different SVM-based training methods include maximizing the margin as an optimization problem.

Mathematically, a linear SVM (e.g., non-linear SVMs are also contemplated) can be represented, for example, in the following two equivalent forms: using a weight vector representation; or using a support vector representation. The weight vector representation mathematically can represent an SVM (the separating hyperplane) as a pair of parameters <W, b>, where W denotes a weight vector and b represents a threshold or bias term. The weight vector W can include a list of tuples of the form <$f_i$, $w_i$>, where fi denotes a feature and wi denotes the weight associated with feature $f_i$. This corresponds to a vector space representation of the weight vector W. Here, the weight value $w_i$ associated with each feature $f_i$ and the threshold value b may be learned from examples using standard SVM learning algorithms. This weight vector representation is also known as the primal representation. The support vector representation of an SVM model, also known as the dual representation, mathematically represents an SVM (the separating hyperplane) as a pair of parameters <SV, b>, where SV denotes a list of example tuples, known as support vectors, and b represents a threshold. The support vector list can include tuples of the form <SVi, ~i>, where SVi denotes an example behavior pattern with known classification and ~i denotes the weight associated with example SVi. The Euclidean (perpendicular) distance from the hyperplane to the support vectors is known as the margin of the support vector machine. The parameters of the support vector machine model may be determined using a learning algorithm in conjunction with a training data set that characterizes the information need, i.e., a list of behavior pattern parameters that have been labeled as spammer or non-spammer. Abstractly, learning a linear SVM model may include determining the position and orientation of the hyperplane that separates the spam examples and non-spam examples that are used during learning. The parameters of the weight vector representation or the support vector representation may also be determined. Learning a support vector machine can be viewed both as a constraint satisfaction and optimization algorithm, where the first objective is to determine a hyperplane that classifies each labeled training example correctly, and where the second objective is to determine the hyperplane that is furthest from the training data, so that an spam prediction model is determined.

Classifying unknown behavior patterns for an unknown sender ID using an SVM model can reduce to determining which side of the hyperplane the example falls. If the example falls on the spam side of the hyperplane then the example is assigned a spam label; otherwise it is assigned a non-spam label. This form of learned SVM is known as a hard SVM. Other types of SVM exist which relax the first objective. For example, not requiring all training examples to be classified correctly by the SVM leads to a type known as soft SVMs. In this case the SVM learning algorithm sacrifices accuracy of the model with the margin of the model. Other types of SVMs and SVM learning algorithms also exist and may be utilized by techniques of the present invention. The confidence for each label prediction can be proportional to the distance of the example (e.g., the sender ID) from the separating hyperplane.

Referring back to FIG. 2B, when a new known sender ID and its spam determination has been completed, the new known behavior patterns for the known sender ID with their associated spam indicators may be retained, e.g., in database 260. The database may include a list of sender IDs and their behavior patterns, a confidence value, a spam indicator field (e.g. set to 1 for an spam sender and 0 for non-spam or possibly suspected spam sender), and a suspected spam indicator field (e.g. set to 1 for suspected spam and set to 0 for non-spam sender).

Each behavior pattern may be stored as an accessible fingerprint that helps in locating, searching and comparing behavior patterns quickly. For instance, each behavior pattern may be stored as a multi-dimensional vector, for which each dimension represents a particular recipient. Other parameters, such as an email time indicator or statistic may also be represented with a particular vector. The vector for a particular unknown sender ID may be projected a smaller vector space. For example, if the known recipients include 300 million sender ID, each unknown sender ID may be associated with far less recipients (e.g., less than 1000).

Figure 3:
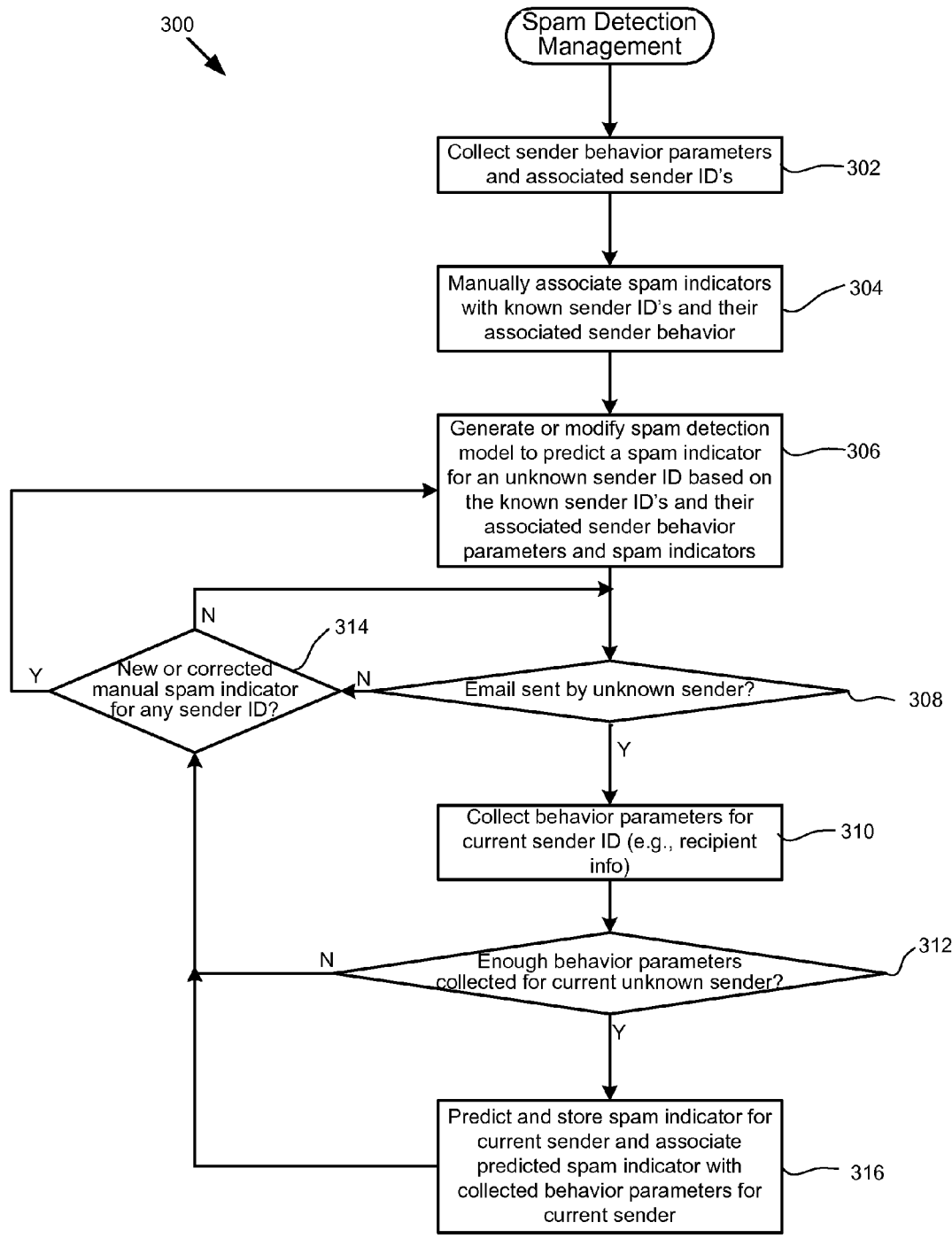
FIG. 3 is a flow chart illustrating a spam detection management procedure in accordance with another embodiment of the present invention.

FIG. 3 is a flow chart illustrating a spam detection management procedure 300 in accordance with another embodiment of the present invention. Sender behavior parameters associated sender IDs may be initially collected in operation 302. Spam indicators may be manually associated with the known sender IDs and their associated sender behavior in operation 304. For instance, a service provider administrator may assess behavior patterns to determine spammers and non-spammers and their associated behavior patterns.

A spam detection model may then be generated or modified to predict a spam indicator for an unknown sender ID based on the known sender IDs and their associated sender behavior parameters and spam indicators in operation 306. It may then be determined whether an email has been sent by an unknown sender in operation 308. For instance, an email server receives an email associated with a sender ID (e.g., IP address) that is not also associated with a spam indicator. If an email by an unknown sender has been sent, behavior parameters for the current unknown sender may then be collected in operation 310. The behavior parameters for each unknown sender ID may continue to be collected.

It may be determined whether enough behavior parameters have been collected for the current unknown sender ID in operation 312. It may be determined that there is enough collected behavior parameters based on any suitable criteria. For instance, the sender ID may have to be associated with more than a particular number of recipients so that the model can operate correctly (e.g., with a predetermined level of confidence) on such recipient data. If enough behavior parameters have been collected, a spam indicator for the current sender may then be predicted and stored and the predicted spam indicator may then be associated with the collected behavior parameters for the current sender in operation 316.

However, if enough behavior parameters have not been collected for a current unknown sender or an email has not yet been sent by an unknown sender, it may then be determined whether a new or corrected spam indicator for any sender ID is present in operation 314. If a new or corrected manual spam indicator is present, the spam detection model may then be modified in operation 306. For instance, the model is modified based on the new or corrected spam indicator and its associated behavior parameters. If there is no new or corrected manual spam indicator, the process may then continue to wait for an email sent by an unknown sender in operation 308.

Figure 4:
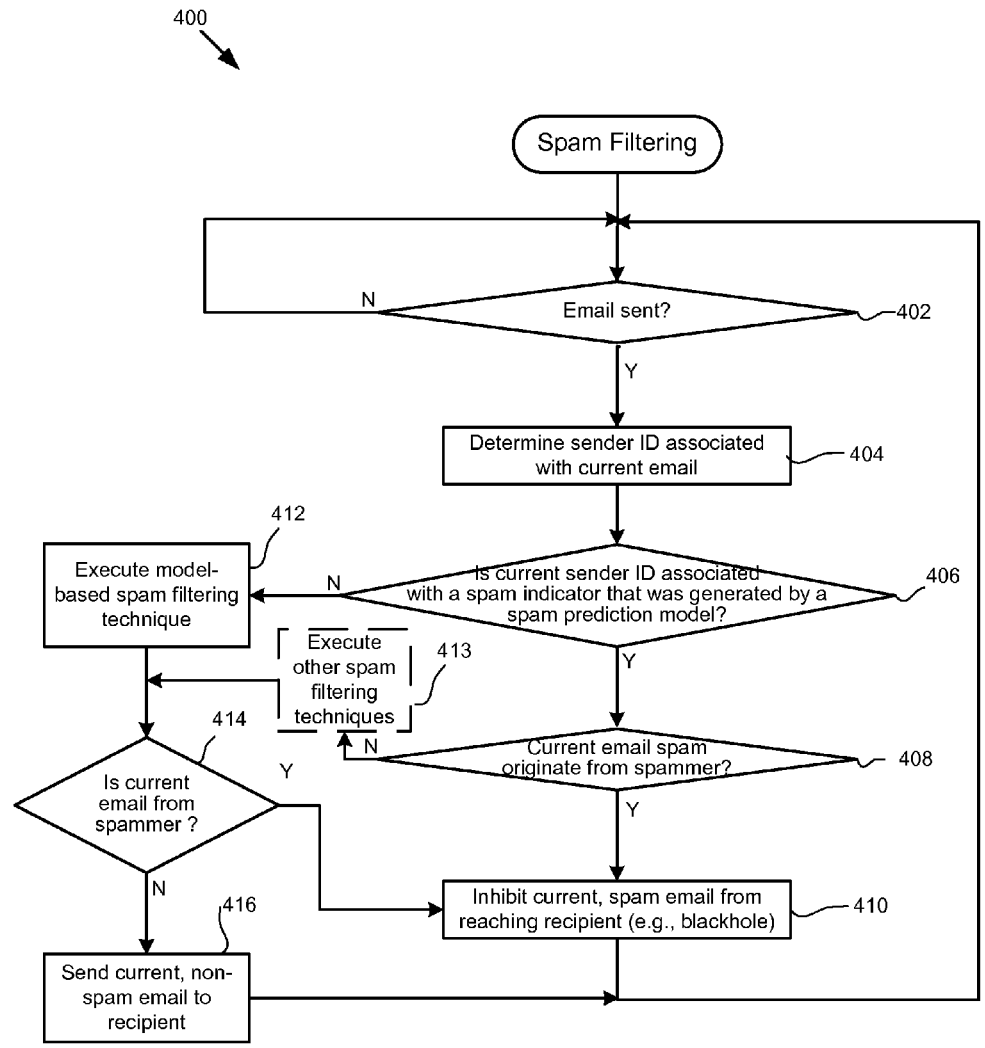
FIG. 4 is a flow chart illustrating a spam filtering procedure in accordance with one implementation of the present invention.

FIG. 4 is a flow chart illustrating a spam filtering procedure 400 in accordance with one implementation of the present invention. Initially, it may be determined whether an email is sent in operation 402. If no email has been sent, the process may wait for an email.

When an email is sent, a sender ID associated with the current email may then be determined in operation 404. For instance, the sender ID for the email is noted. It may then be determined whether the current sender ID is associated with a spam indicator that was generated by a spam prediction model in operation 406. For instance, it is determined whether the sender ID is associated with a spam or non-spam designation that was determined by a spam prediction model, e.g., in a black- or white-list). Sender IDs that are associated with a potential spammer indicator may be reassessed by the prediction model.

If a spam indicator is present for the current sender ID, it may also be determined whether the prediction model indicated that the current email originated from a spammer in operation 408. If the current email has been sent by a designated spammer, the current spam email may then be inhibited from reaching its recipient (e.g., by blackholing or dropping the email) in operation 410.

If the current email has been determined by the model process to not originate from a spammer, other spam filtering techniques (for example, non-model based techniques) may be executed in operation 413. These other filtering techniques are optional. If a spam filtering process is used, it may then be determined whether the current email was sent by a spammer based on these other spam filtering techniques and/or model spam indicator in operation 414. If the current email is not spam (or other spam filtering techniques are not used), the current non-spam email may then be sent to the intended recipient in operation 416.

If the current sender ID is not associated with a spam indicator from the model process, the model based filtering technique may be executed (e.g., with respect to the behavior pattern of the current sender ID) in operation 414. However, execution of the model would likely be performed independent of receipt of each individual email. Thus, the model can optionally not be used. In the former case, it may then be determined whether the current email was sent by a spammer based on the model-based spam filtering technique in operation 414. If the current email is not spam (or the model-based spam filtering technique is not used), the current non-spam email may then be sent to the intended recipient in operation 416.

Figure 5:
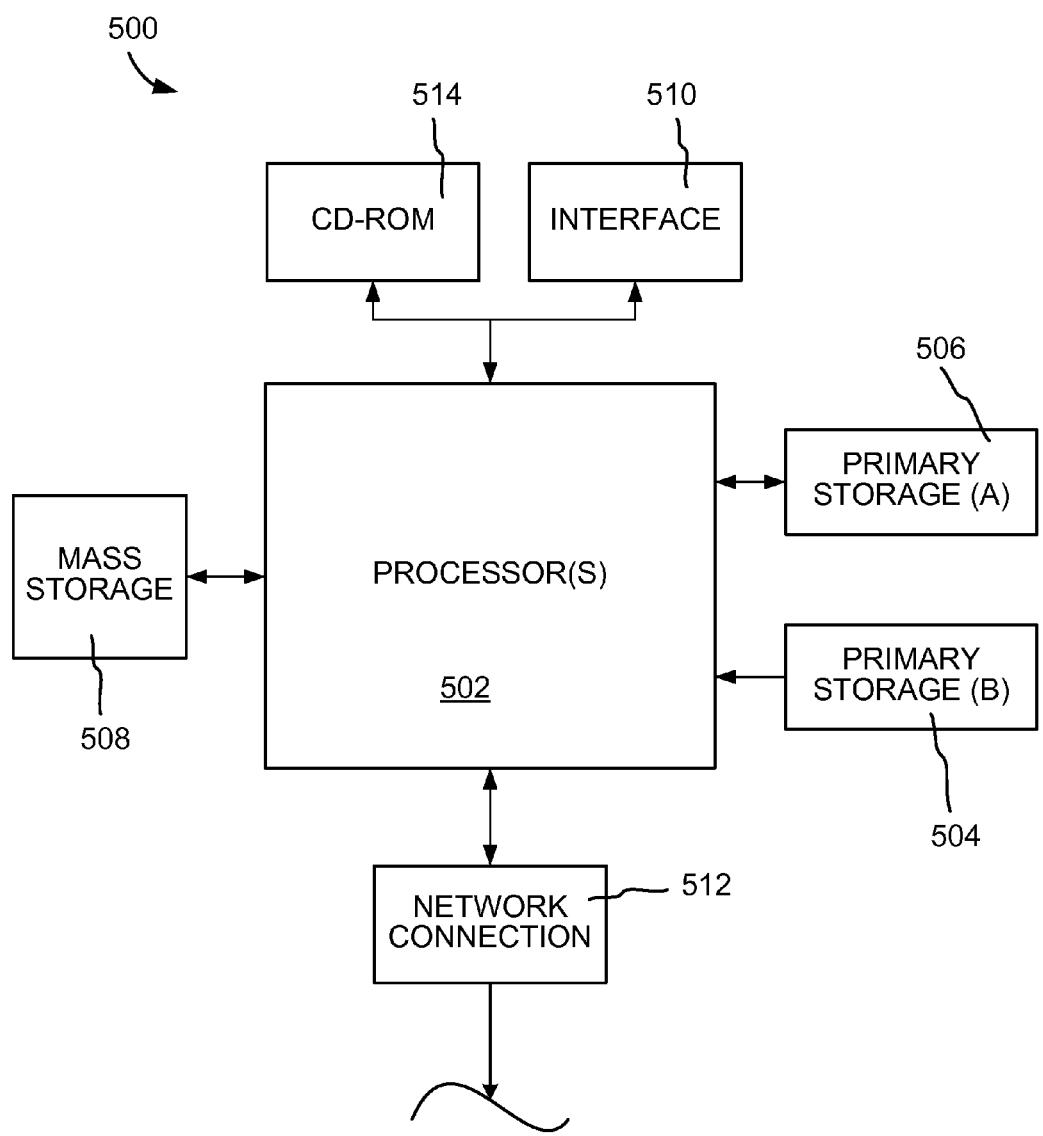
FIG. 5 illustrates an example computer system in which specific embodiments of the present invention may be implemented.

FIG. 5 illustrates a typical computer system that, when appropriately configured or designed, can serve as a spam prediction and detection system. The computer system 500 includes any number of processors 502 (also referred to as central processing units, or CPUs) that are coupled to storage devices including primary storage 506 (typically a random access memory, or RAM), primary storage 504 (typically a read only memory, or ROM). CPU 502 may be of various types including microcontrollers and microprocessors such as programmable devices (e.g., CPLDs and FPGAs) and unprogrammable devices such as gate array ASICs or general-purpose microprocessors. As is well known in the art, primary storage 504 acts to transfer data and instructions uni-directionally to the CPU and primary storage 506 is used typically to transfer data and instructions in a bi-directional manner. Both of these primary storage devices may include any suitable computer-readable media such as those described herein. A mass storage device 508 is also coupled bi-directionally to CPU 502 and provides additional data storage capacity and may include any of the computer-readable media described herein. Mass storage device 508 may be used to store programs, data and the like and is typically a secondary storage medium such as a hard disk. It will be appreciated that the information retained within the mass storage device 508, may, in appropriate cases, be incorporated in standard fashion as part of primary storage 506 as virtual memory. A specific mass storage device such as a CD-ROM 514 may also pass data unidirectionally to the CPU.

CPU 502 is also coupled to an interface 510 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 502 optionally may be coupled to an external device such as a database or a computer or telecommunications network using an external connection as shown generally at 512. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store recipient behavior patterns, sender IDs, spam indicators, confidence values, associations between any of these parameters, one or more prediction models, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A computer implemented method of filtering unsolicited bulk electronic mail (email), comprising:

receiving a plurality of emails associated with a particular sender identifier (ID), the plurality of emails associated with the particular sender ID including emails sent by the particular sender ID;

determining whether the emails sent by the particular sender ID comprise unsolicited bulk email based, at least in part, upon one or more sender characteristics, which are associated with the particular sender ID, using a probabilistic model, wherein the sender characteristics of the particular sender ID includes a particular pattern for messages associated with the particular sender ID, wherein the particular pattern includes identification of recipients to which the particular sender ID sends emails, wherein the particular pattern indicates whether any of the recipients of the emails sent by the particular sender ID have mutually exchanged messages with one another, wherein the particular pattern indicates whether a first one of the recipients previously sent a message to a second one of the recipients; and inhibiting the emails sent by the particular sender ID from reaching recipients of such emails if the emails sent by the particular sender ID are determined to be unsolicited bulk emails.

2. The method of claim 1, wherein the probabilistic model is generated from a training process that is based on a training set of sender characteristics that have been associated with indicators for defining whether specific sender IDs are associated with unsolicited bulk emails.

3. The method of claim 1, wherein the particular pattern further indicates a geographic distance between a sender associated with the sender ID and the recipients.

4. The method of claim 1, wherein the mutually exchanged messages comprise instant messages.

5. A computer implemented method of facilitating the filtering of unsolicited bulk electronic mail (email), comprising:

logging a plurality of recipient patterns for known spammers based, at least in part, on a plurality of emails associated with the known spammers, the plurality of emails associated with the known spammers including emails sent by the known spammers;

generating or modifying a probabilistic model for predicting whether an unknown sender identity is a spammer based, at least in part, on the logged recipient patterns for the known spammers, wherein the logged recipient patterns for each of the known spammers includes identification of recipients to which the known identified spammer sends emails;

wherein the logged recipient patterns for each of the known spammers indicate whether any of the recipients of the emails sent by the corresponding one of the known spammers have mutually exchanged messages with one another; and determining whether a particular sender identity is a spammer based, at least in part, upon applying the probabilistic model to logged recipient patterns for the particular sender identity, wherein the logged recipient patterns for the particular sender identity indicate whether any of the recipients of emails sent by the particular sender identity have mutually exchanged messages with one another;

wherein one of the logged recipient patterns for one of the known spammers indicates whether a first one of the recipients of the emails sent by the one of the known spammers previously sent a message to a second one of the recipients of the emails sent by the one of the known spammers, and wherein one of the logged recipient patterns for the particular sender identity indicates whether a first one of the recipients of the emails sent by the particular sender identity previously sent a message to a second one of the recipients of the emails sent by the particular sender identity.

6. The method of claim 5, wherein the unknown sender identity is a sender Internet Protocol (IP) address.

7. The method of claim 5, wherein the known spammers have been identified, at least in part, by a plurality of recipients of the emails who identify such received emails as spam.

8. The method of claim 5, wherein each combination of recipients is associated with a score, and wherein the model is configured to determine a total score for each recipient pattern and predict whether each sender is a spammer based, at least in part, on such total score for the recipient pattern.

9. The method of claim 5, wherein the logged recipient patterns further comprise at least one of a maximum frequency of emails sent by the particular sender ID or a minimum frequency of emails sent by the particular sender ID.

10. The method of claim 5, further comprising:
logging a plurality of recipient patterns for known non-spammers based, at least in part, on a plurality of emails associated with the known non-spammers, the plurality of emails associated with the known non-spammers including emails sent by the known non-spammers;
wherein generating or modifying the probabilistic model for predicting whether an unknown sender identity is a spammer is performed further based, at least in part, on the logged recipient patterns for the known non-spammers.

11. The method of claim 5, further comprising:
logging recipient patterns for the particular sender identity based, at least in part, on the emails sent by the particular sender identity.

12. An apparatus comprising at least a processor and a memory, wherein the processor and/or memory are configured to perform the following operations:
logging a plurality of recipient patterns for known spammers based, at least in part, on a plurality of emails associated with the known spammers, the plurality of emails including emails sent by the known spammers;
generating or modifying a probabilistic model for predicting whether an unknown sender identity is a spammer based, at least in part, on the logged recipient patterns for the known spammers, wherein the logged recipient patterns for each of the known spammers includes identification of recipients to which the known identified spammer sends emails, wherein the logged recipient patterns for each one of the known spammers indicates whether any of the recipients of the emails sent by the one of the known spammers have mutually exchanged messages with one another; and
determining a likelihood that a particular sender identity is a spammer based, at least in part, upon applying the probabilistic model to logged recipient patterns for the particular sender identity, wherein the logged recipient patterns for the particular sender identity indicate whether any of the recipients of emails sent by the particular sender identity have mutually exchanged messages with one another;
wherein one of the logged recipient patterns for one of the known spammers indicates whether a first one of the recipients of the emails sent by the one of the known spammers previously sent a message to a second one of the recipients of the emails sent by the one of the known spammers, and wherein one of the logged recipient patterns for the particular sender identity indicates whether a first one of the recipients of the emails sent by the particular sender identity previously sent a message to a second one of the recipients of the emails sent by the particular sender identity.

13. The apparatus of claim 12, wherein the known spammers have been identified, at least in part, by a plurality of recipients of the emails who identify such received emails as spam.

14. The apparatus of claim 12, wherein the processor and/or memory are further configured for using the model to predict a likelihood of an unknown sender being a spammer based on the unknown sender's recipient pattern.

15. The apparatus of claim 12, wherein the model is configured to determine a total score for each recipient pattern and predict whether each sender is a spammer based, at least in part, on such total score for the recipient pattern.

16. The apparatus of claim 12, wherein one of the recipient patterns for one of the known spammers indicates whether a first recipient of a particular one of the emails sent by the one of the known spammers previously sent a message to a second recipient of the particular one of the emails sent by the one of the known spammers, and wherein one of the recipient patterns for the particular sender identity indicates whether a first recipient of a particular one of the emails sent by the particular sender identity previously sent a message to a second recipient of the particular one of the emails sent by the particular sender identity.

17. The apparatus of claim 12, wherein the recipient patterns for the particular sender identity indicates a geographic distance between a sender associated with the particular sender identity and the recipients.

18. At least one non-transitory computer readable storage medium having computer program instructions stored thereon that are arranged to perform the following operations:
logging a plurality of recipient patterns for known spammers based, at least in part, on a plurality of emails associated with the known spammers, the plurality of emails associated with the known spammers including emails sent by the known spammers;
generating or modifying a probabilistic model for predicting whether an unknown sender identity is a spammer based, at least in part, on the logged recipient patterns for the known spammers, wherein the logged recipient patterns for each of the known spammers includes identification of recipients to which the known identified spammer sends emails, wherein the logged recipient patterns for each one of the known spammers indicates whether any of the recipients of the emails sent by the one of the known spammers have mutually exchanged messages including instant messages with one another; and
determining whether a particular sender identity is a spammer based, at least in part, upon applying the probabilistic model to logged recipient patterns for the particular sender identity, wherein the logged recipient patterns for the particular sender identity indicate whether recipients of the emails sent by the particular sender identity have mutually exchanged messages with one another;
wherein one of the recipient patterns for one of the known spammers indicates whether a first one of the recipients of the emails sent by the one of the known spammers previously sent a message to a second one of the recipients of the emails sent by the one of the known spammers, and wherein one of the recipient patterns for the particular sender identity indicates whether a first one of the recipients of the emails sent by the particular sender identity previously sent a message to a second one of the recipients of the emails sent by the particular sender identity.

19. The at least one non-transitory computer readable storage medium of claim 18, wherein the unknown sender identity is a sender Internet Protocol (IP) address.

20. The at least one non-transitory computer readable storage medium of claim 18, wherein the known spammers have been identified, at least in part, by a plurality of recipients of the emails who identify such received emails as spam.

21. The at least one non-transitory computer readable storage medium of claim 18, wherein the computer program instructions stored thereon that are further arranged for using the model to predict a likelihood of an unknown sender being a spammer based, at least in part, on the unknown sender's recipient pattern.

22. The at least one non-transitory computer readable storage medium of claim 18, wherein each combination of recipients is associated with a score, and wherein the model is configured to determine a total score for each recipient pattern and predict whether each sender is a spammer based, at least in part, on such total score.

\* \* \* \* \*